US007672416B2

(12) United States Patent
Hadzic et al.

(10) Patent No.: US 7,672,416 B2
(45) Date of Patent: Mar. 2, 2010

(54) HIGH-SPEED SERIAL TRANSCEIVER WITH SUB-NOMINAL RATE OPERATING MODE

(75) Inventors: Ilija Hadzic, Millington, NJ (US); Dusan Suvakovic, Marina del Rey, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1340 days.

(21) Appl. No.: 11/093,638

(22) Filed: Mar. 30, 2005

(65) Prior Publication Data

US 2006/0222129 A1    Oct. 5, 2006

(51) Int. Cl.
*H04L 7/04* (2006.01)
*H04L 7/00* (2006.01)
(52) U.S. Cl. .................. 375/360; 375/355
(58) Field of Classification Search .......... 375/354, 375/355, 357, 359, 360, 371, 316, 322, 324, 375/326; 327/141, 144, 145, 151, 162, 163, 327/100
See application file for complete search history.

(56) References Cited

U.S. PATENT DOCUMENTS

| | | | | |
|---|---|---|---|---|
| 5,412,687 | A * | 5/1995 | Sutton et al. ............ | 375/133 |
| 5,757,297 | A * | 5/1998 | Ferraiolo et al. ........ | 341/100 |
| 6,587,525 | B2 * | 7/2003 | Jeong et al. ............. | 375/354 |
| 6,801,591 | B1 * | 10/2004 | Frencken ................ | 375/373 |
| 2002/0131539 | A1 * | 9/2002 | Li et al. .................. | 375/355 |
| 2005/0069071 | A1 * | 3/2005 | Kim et al. ............... | 375/355 |
| 2005/0238126 | A1 * | 10/2005 | Ribo et al. .............. | 375/355 |
| 2006/0062327 | A1 * | 3/2006 | Dally ..................... | 375/316 |

OTHER PUBLICATIONS

J. Kim et al., "Multi-Gigabit-Rate Clock and Data Recovery Based on Blind Oversampling," IEEE Communications Magazine, pp. 68-74, Dec. 2003.
Shelly Davis, "On-Chip, Real-Time Logic Analysis with ChipScope ILA," XCell Journal (Xilinx), vol. 36, pp. 19-21, Q2 2000.
C-K.K. Yang et al., "A 0.5-μm CMOS 4.0-Gbit/s Serial Link Transceiver with Data Recovery Using Oversampling," IEEE Journal of Solid-State Circuits, vol. 33, No. 5, pp. 713-722, May 1998.
K. Lee et al., "A CMOS Serial Link for Fully Duplexed Data Communication," IEEE Journal of Solid State Circuits, vol. 30, No. 4, pp. 353-364, Apr. 1995.

* cited by examiner

*Primary Examiner*—David C Payne
*Assistant Examiner*—Vineeta S Panwalkar
(74) *Attorney, Agent, or Firm*—Ryan, Mason & Lewis, LLP

(57) ABSTRACT

A communication device comprises a receiver and a data recovery module. The receiver may be an element of a serial transceiver embedded in or otherwise associated with an FPGA or other type of reconfigurable hardware. The receiver is operable with an unlocked sampling clock. The data recovery module is configured to detect transition edges in data signal samples generated by the receiver using the unlocked sampling clock, and to determine from the detected edges a sampling point for use in recovery of the associated data. The data recovery module is further configured to provide adjustment in the sampling point in the presence of transition edge variations, such as one or more exception conditions, that are attributable to the unlocked sampling clock.

20 Claims, 5 Drawing Sheets

HIGH-SPEED SERIAL TRANSCEIVER WITH SUB-NOMINAL RATE OPERATING MODE

FIELD OF THE INVENTION

The present invention relates generally to communication devices, and more particularly to communication devices which comprise serial transceivers or other types or arrangements of receiver elements.

BACKGROUND OF THE INVENTION

High-speed serial transceivers are commonly used in high-performance field programmable gate array (FPGA) devices. Examples include the Xilinx Virtex II Pro device family, described in Xilinx, Inc., "Virtex-II Pro Platform FPGA Handbook," August 2004, UG012 (v3.0), and the Altera Stratix GX device family, described in Altera Corporation, "Stratix GX FPGA Family Datasheet," December 2004, DS-STXGX-2.2. Such devices are capable of driving optical components and backplane interfaces at high speeds without any external circuitry other than a small set of passive components for termination and bias. The apparent advantage is the ability to implement a communication system in which everything from the backplane to the optics is reconfigurable.

Typical speeds on the serial line range from several hundred megabits per second to a few gigabits per second. For example, the operating range of the Rocket I/O block in a Xilinx Virtex II Pro device is between 622 Mb/s and 3.125 Gb/s. The choice of the operating range is typically a market driven tradeoff between the number of applications that a device can cover and the complexity and cost of the embedded transceiver.

Many data networking and telecom applications require that the serial line operate at multiple speeds, some of which are outside the transceiver's nominal range. For example, a gigabit Ethernet device is often implemented as a dual-speed system that can run at either the nominal 1 Gb/s speed or the reduced 100 Mb/s speed. See, for example, IEEE Standard 802.3, "Carrier Sense Multiple Access with Collision Detection (CSMA/CD) Access Method and Physical Layer Specifications," March 2002. Furthermore, reconfigurable communication systems generally require a high degree of flexibility, with a wide range of communication speeds being an important dimension. When the system is in high-speed mode, the signaling rate on the interface is high enough to warrant the use of high-speed serial transceivers. However, the signaling rate in the low-speed mode is more appropriate for a general-purpose I/O block, typically using a different set of pins than those used for the high-speed serial transceiver.

Although it is possible to implement an external circuit that routes the signal to different pins depending on the mode the system is in, such a design would result in reduced system density, which is an undesirable property in many cases. On the other hand, combining a general-purpose I/O block with the high-speed serial transceiver using the same set of pins would likely result in various technical and economic challenges that would discourage the device vendor from implementing it. Finally, a brute-force approach of simply extending the operating range of the transceiver is not practical, because of the finite frequency range in which the phase locked loop (PLL) circuit in the clock and data recovery (CDR) block of the receiver can operate. A wider range requires a more complex and more expensive CDR block in the receiver. Economic factors thus limit the practical range of frequencies for which the clock and data can be recovered.

Accordingly, a need exists for an improved approach to accommodating a range of communication speeds, including one or more sub-nominal speeds, in a communication device having a serial transceiver or other type of receiver.

SUMMARY OF THE INVENTION

The present invention in an illustrative embodiment advantageously provides a communication device having a serial transceiver which is operable at a number of different speeds, including a sub-nominal speed.

In accordance with one aspect of the invention, a communication device comprises a receiver and a data recovery module. The receiver may be an element of a serial transceiver embedded in or otherwise associated with an FPGA or other type of reconfigurable hardware. The receiver is operable with an unlocked sampling clock. The data recovery module is configured to detect transition edges in data signal samples generated by the receiver using the unlocked sampling clock, and to determine from the detected edges a sampling point for use in recovery of the associated data. The data recovery module is further configured to provide adjustment in the sampling point in the presence of transition edge variations, such as one or more exception conditions, that are attributable to the unlocked sampling clock.

In accordance with another aspect of the invention, the receiver may be operable in at least first and second modes, with the second mode having a data rate lower than that of the first mode. For example, the data rate of the second mode may be below a lower bound of a nominal operating data rate range of the receiver, while the data rate of the first mode is within the nominal operating data rate range. The receiver operates in the first mode with a locked sampling clock, and in the second mode with the above-noted unlocked sampling clock. The locked sampling clock may be locked to a recovered transmit clock.

In the illustrative embodiment, the data recovery module comprises a window register for storing a designated number of the data signal samples, a plurality of phase edge counters receiving respective sets of samples from the window register, each counting edges for a designated bit position, control circuitry coupled to the phase edge counters and identifying from their respective counts a particular phase, and a data bit buffer for outputting one or more data bits responsive to the particular phase. The data recovery module may also include a phase encoder for generating an output identifying the particular phase, and a bit selector coupled between the window register and the data bit buffer, with the bit selector receiving as a select signal the output of the phase encoder and supplying one or more of the data signal samples from the window register to the data bit buffer responsive to the select signal.

The illustrative embodiment allows the efficient implementation of a dual-speed 100/1000 Mb/s Ethernet device in reconfigurable hardware, and can be extended in a straightforward manner to accommodate numerous alternative device configurations and communication protocols.

DETAILED DESCRIPTION OF THE INVENTION

Figure 1:
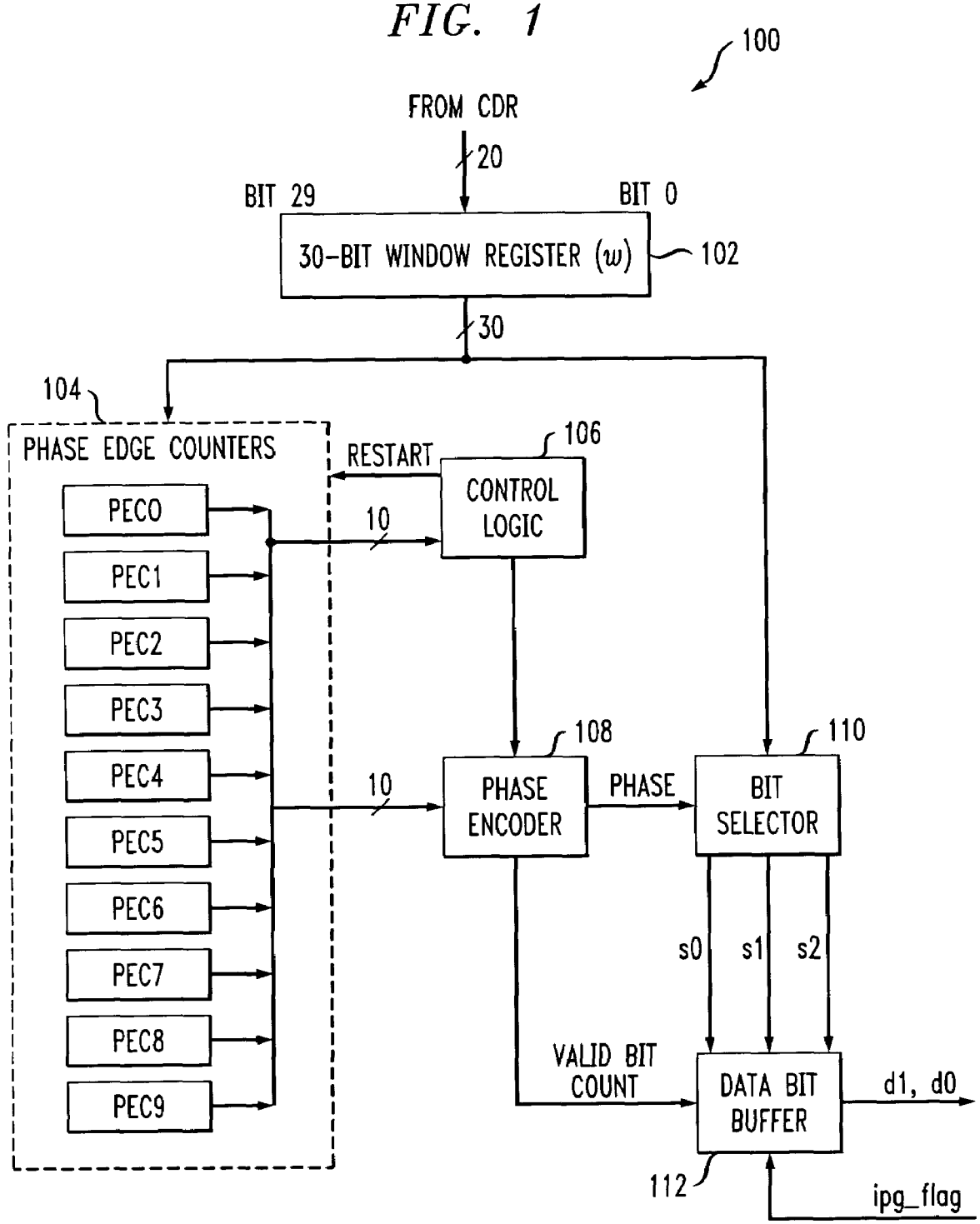
FIG. 1 is a block diagram of a data recovery module of a communication device in an illustrative embodiment of the invention.

The present invention will be illustrated herein in the context of a data recovery module suitable for implementation in a reconfigurable communication device, such as an FPGA device having embedded therein or otherwise associated therewith one or more embedded high-speed serial transceivers. It should be understood, however, that the present invention, although particularly well-suited for use in this context, is not limited thereto. The techniques of the present invention are more generally suitable for use in any communication device application in which it is desirable to provide a range of operating data rates for a receiver through the use of an appropriately-designed data recovery module.

The term "communication device" as used herein is therefore intended to be construed broadly, so as to encompass, by way of example and without limitation, any arrangement involving the exchange of information between two elements of a system without regard to the particular application, medium, etc. Accordingly, a device which is utilized, for example, in the exchange of data between two boards connected over a backplane is considered a communication device as that term is used herein.

A communication device in accordance with the invention may be implemented in the form of one or more integrated circuits. For example, in one possible implementation, the communication device may comprise a single application-specific integrated circuit (ASIC) which includes a receiver and a data recovery module, with the receiver being a "core" element that is not subject to modification by the ASIC vendor, and the data recovery module being implemented in hardware, such as an FPGA, developed around the core element by the ASIC vendor. As another example, the receiver may be on one integrated circuit, and the data recovery module on another. Numerous other single or multiple integrated circuit arrangements may be used in implementing the invention, and all such arrangements are intended to be encompassed by the general term "communication device" as used herein.

In the illustrative embodiment, the data recovery module is part of the physical layer circuitry of a dual-speed 100/1000 Mb/s Ethernet device. All components other than optics are implemented using an FPGA device with an embedded or otherwise associated high-speed serial transceiver. The low-speed mode is outside the transceiver's nominal range, so the PLL circuit in the transceiver CDR block cannot reliably lock to the received clock. We solve the problem in the illustrative embodiment by using the transceiver as a sampling circuit with an unlocked sampling clock. More specifically, a CDR block with a high-frequency local reference clock is used as a sampling circuit for the low-frequency data signal. This approach, which utilizes a type of blind oversampling, allows the transceiver to recover data whose signaling rate is lower than the lower bound of the transceiver's operating range.

Nominally, the sampling rate is the ratio between the transceiver reference frequency and the data signaling rate. In practice, the CDR block may not achieve lock, in which case the sampling rate varies and its behavior over time is defined by the behavior of the unlocked PLL circuit inside the CDR block, which behavior may include jitter, varying duty cycle, non-linear and non-monotonic drift, etc. The data recovery module in the illustrative embodiment compensates for the effects associated with the unlocked PLL circuit of the CDR block and reliably recovers the data bits of the low-speed signal.

The techniques of the illustrative embodiment can be generalized to transmission protocols other than those of the 100/1000 Mb/s Ethernet device. For example, the data recovery module design can easily be adapted to implement other devices and systems that may put the operating point of the transceiver outside its nominal range, extending the scope of applications in which an "FPGA to the optics" approach is viable.

Before the data recovery module is described in detail with reference to FIG. 1, a number of issues relating to sampling will be described.

As indicated above, the illustrative embodiment utilizes blind oversampling. In general, the oversampling concept (not necessarily blind) is easiest to illustrate using the transmitter circuit, which compared to the receiver is a trivial element in the system. On the fiber, the signaling rate of 100 Mb/s Ethernet is 125 Mb/s due to the overhead of the 4B5B line code. See, e.g., D. Munoz-Rodriguez et al., "Line Coding for Very High Speed LAN," Electronics Letters, 26(24):2051-2053, November 1990, for more information about properties of the 4B5B line code. Hence, transmitting ten consecutive copies of each line code bit at the higher rate of 1.25 Gb/s results in a waveform that is identical to the one produced by transmitting each bit only once, at the rate of 125 Mb/s. Likewise, a receiver running at 1.25 Gb/s should downsample the received signal ten times to recover the original bit stream. Ideally, the CDR block would interpret the received bit sequence as a 1.25 Gb/s signal with sparse transitions and lock to the perceived transmit clock, which is exactly 10 times faster than the actual 125 Mb/s transmit clock. To recover the data, the receiver should drop 9 out of 10 samples and retain the sample that is farthest away from the edges to minimize the effect of the clock jitter. Notice that as soon as the lock of the sampling clock has been achieved, the relative location of the sampling point remains constant until the communication link is reset.

If the sampling clock is asynchronous to the transmitter clock of the remote party, the oversampling is called blind. A PLL-based CDR used as an oversampler generally performs blind oversampling because it cannot lock reliably. This results from the fact that the reduced number of input signal transitions reduces the PLL phase detector gain and narrows the loop bandwidth, which in turn narrows the PLL capture range. See, e.g., C. R. Hogge, Jr., "A Self Correcting Clock Recovery Circuit," IEEE Journal of Lightwave Technology, 3(6):1312-1314, December 1985, and A. Blanchard, "Phase-Locked Loops," John Wiley and Sons, 1976. If the reduced capture range is narrower than the maximum difference in frequency between the transmit and the receive clock allowed by the applicable communication standard, then a certain percentage of equipment designed this way will operate with the unlocked CDR. Therefore, the system must be designed to operate even if the CDR never locks. Depending on the CDR design and the particular device, the resulting sampling clock will either (1) keep attempting (and failing) to lock to the received signal, (2) lock to the local reference (some transceivers provide an option to force the lock to the local reference) or (3) lock to the received clock.

Case (3) is rare because, due to process variation, locking to the received clock can typically occur only for a small percentage of devices whose manufacturing parameters happen to fall into a very narrow range. Moreover, case (3) is trivial and requires no special techniques for data recovery other than downsampling.

Case (2) corresponds to a typical blind oversampling scenario with a free-running oscillator, as described in, e.g., K. Lee et al., "A CMOS Serial Link for Fully Duplexed Data Communication," IEEE Journal on Solid-State Circuits, 30(4):353-364, April 1995, C.-K. K. Yang et al., "A 0.5-μm CMOS 4.0-Gbit/s Serial Link Transceiver with Data Recovery Using Oversampling," IEEE Journal on Solid-State Circuits, 33(5):713-722, May 1998. The relative sampling point is no longer constant and must be continuously readjusted to compensate for the jitter and systematic drift of the sampling clock.

Case (1), which is what occurs in the Xilinx Rocket I/O transceiver, is the most difficult to compensate because the sampling clock misbehaves as the PLL circuit keeps attempting to acquire the lock on the low-speed signal. As a result, additional jitter and wander are introduced in the sampling clock, and abrupt changes in clock phase, visible as isolated events of uneven duty cycle, occur. Furthermore, the CDR block may cause the sampling frequency to periodically vary within the nominal capture range, in an attempt to make it closer to the transmitter frequency and facilitate locking. The blind oversampling should therefore be designed to provide a sufficient margin, taking into account the nominal capture range of the PLL circuit used to implement the CDR block. The effects are difficult to characterize because they depend on implementation details of the transceiver, which are often not publicly available, so experimental evaluation may be the only option.

If one observed the time window of sampled bits, the most visible effect would be the systematic drift of the position of the edges caused by the frequency difference between the transmitter and the sampling clock. Furthermore, the drift function may not be monotonic because the sampling clock frequency may wander around a certain value as the unlocked CDR block attempts to adjust the phase. As a result, constant readjustment of the sampling point is necessary for the receiver to work reliably. This adjustment may be performed by constructing a sliding window of samples and searching for bit transitions within the window. The statistical probabilities of the transition locations are established and the location with the highest probability is declared to be the bit edge. The sampling point is then selected as a midpoint between two edges and the process is repeated. The design parameters of interest are the window length W (in data bits) and the sampling rate M (in sample bits per data bit).

In J. Kim et al., "Multi-Gigabit-Rate Clock And Data Recovery Based on Blind Oversampling," IEEE Communications Magazine, 41(12):68-74, December 2003, it has been shown that the performance of a blind oversampler primarily depends on the product of the window length W and the sampling rate M (henceforth referred to as the W·M product) and that a W·M product of around 300 results in satisfactory performance (bit-error rate less than $10^{-12}$) for a 10 Gb/s Ethernet link. However, the analysis presented, while accounting for the jitter effects, neglects the effect of the systematic drift and assumes that the nominal frequency of the sampling clock is exactly M times the data rate. In practice, this assumption is rarely satisfied because of the finite oscillator accuracy. Hence, drift occurs which, according to our observations, represents the dominant impairment factor.

Conventional analyses of blind oversampling generally do not factor in both the jitter and the systematic drift. Whereas a larger W·M product is desirable in terms of jitter immunity, its value is practically limited by the drift rate of the received signal relative to the sampling clock. If the window spans the time in which the phase of the received signal drifts by more than one bit, the information collected will be obsolete by the time it can be used, resulting in incorrect phase adjustment.

Since the unlocked CDR clock causes a non-linear drift rate, which depends on the CDR's performance outside its nominal operating range, the operation of such a circuit is not universally characterizable. Nonetheless, a suitable value for the W·M product can be found in a straightforward manner. By way of example, specific values for the two parameters may be determined by what is practical from an implementation perspective. Namely, the sampling frequency must fall within the range of the Rocket I/O transceiver and it must be an integer multiple of the data rate. Furthermore, if the interface is intended to operate as a dual-speed Ethernet interface, the preferred reference frequency is either 62.5 MHz or 125 MHz, which are the standard reference frequencies for gigabit Ethernet CDR when operating in its native mode (no oversampling).

For the illustrative embodiment, we use the 62.5 MHz reference and run the Rocket I/O transceiver in the ×20 mode, in which the reference frequency is multiplied by 20 to yield the line rate. Therefore, the nominal sampling frequency is 1.25 GHz and the sampling rate is M=10. This value is consistent with the result reported in the above-cited J. Kim et al. reference that shows that returns on sampling rates higher than 10 are diminishing, suggesting that extensive oversampling is not necessary. For the illustrative embodiment, as implemented in the particular device configuration to be described in conjunction with FIG. 5, it was determined that the maximum drift which results when using a variable window size of minimum W=64 is only one sample bit per window. The choice of parameters W and M is also justified by the value of the resulting W·M product of 640, which is high enough to ensure satisfactory CDR performance. Of course, other values can be used in other embodiments, and can be determined in a straightforward manner.

The data recovery process of the illustrative embodiment will now be described in greater detail. The key function of the data recovery process is to estimate the location of the edges and extract the bit sample at the optimal sampling point. Due to the presence of jitter and wander, the location of the edge is a random variable for which the probability density function has the maximum at the nominal location of the edge and fades down to zero for samples farther from the edge. Hence, the optimal sampling point is the bit farthest from any edge. If the sampling rate is an even number, there are two candidate bits, so we choose one by convention. More specifically, in the illustrative embodiment, the sampling point is assumed to be the bit located six bit positions to the right of an estimated edge, although other conventions could of course be used.

Because of the presence of systematic drift, the edge probability density function floats through the window of samples. Hence, substantially constant re-estimation of edge location is used to properly track the drift.

FIG. 1 shows a data recovery module 100 which performs the data recovery process in the illustrative embodiment. In each clock cycle, sampled data from the CDR block (e.g., Rocket I/O) are received at a 20-bit parallel interface and stored at bit positions 0 through 19 of a 30-bit window register w (not to be confused with the sampling window W discussed previously), also denoted as element 102. Positions 20-29 of register w are filled with bits that used to occupy positions 0-9 of the same register in the preceding clock cycle. In accordance with the sampling point convention described above, the sampling points in register w are 6 bits to the right of the identified edges. Further, because we wish to process exactly two data bits at a time, we consider (for the purposes of sampling) only those edges that fall either between bits 19 and 29, or between bits 9 and 19.

The window register bits w(29) through w(9) drive a bank of phase edge counters (PECs) 104, also denoted PEC0 through PEC9, where bits w(10+i), w(9+i), w(20+i) and w(19+i) feed into the i-th PEC, enabling it to count edges at the i-th bit position (i∈{0 . . . 9}). Each time an edge is detected at the i-th position, the associated PEC increments by 1. The first counter that reaches 64 (the minimum sampling window size W) is declared a winner and the bit position associated with that counter is assumed to be the most likely edge location. At this point, control logic 106 resets all the counters and the process repeats. The phase corresponding to this counter is used for data sampling in the counting period to follow, that is, until the next phase estimate becomes available.

The effective window size in the illustrative embodiment is variable and is determined by the packet content as well as the current location of the edge relative to the sampling instants. Namely, if the transmitted codewords are idle characters (e.g., 10101 in the 4B5B code after NRZI encoding), the transition occurs for each transmitted bit and the winner counter will be determined sooner than if there is a packet transmission, which may not produce an edge on every bit. Furthermore, if the location of the edge relative to the sampling instants is such that multiple counters are progressing at the same time, then it will take longer for the winner to reach the final value. In either case, the minimum window size equals the final counter value and occurs when idle characters are transmitted and only one PEC is progressing.

It is to be appreciated that the invention can be implemented using other techniques to search for the most likely edge location. For example, instead of counting to a fixed number 64, as in the above description, it is possible to count until one of the PECs becomes significantly larger than any other PEC. In other words, if it becomes clear that one of the PECs will win early, the data recovery module can stop counting at that point, determine the phase, and then start over with the next estimation. The result of such an arrangement is a type of adaptive window size, with the window effectively shrinking and expanding as needed. As another example, it is possible to count until the sum of PECs becomes 64 and then find the largest. This variation will guarantee a fixed window size of 64. Of course, the invention is not restricted to use with these or other particular counting variants, and numerous alternative arrangements will be apparent to those skilled in the art.

The data recovery module 100 further comprises a phase encoder 108, a bit selector 110, and a data bit buffer 112.

The phase encoder 108 performs binary encoding of the PEC outputs, by identifying the winner counter and constructing a binary word that represents the encoded phase, which is further used as the select input to the bit selector 110.

At first glance, it may appear that, for the CDR operating in the ×20 mode, the bit selector 110 outputs two data bits in each clock cycle. While this is true most of the time, there are at least two special cases that are direct consequences of the drift and are handled by the phase encoder as described below.

Figure 2:
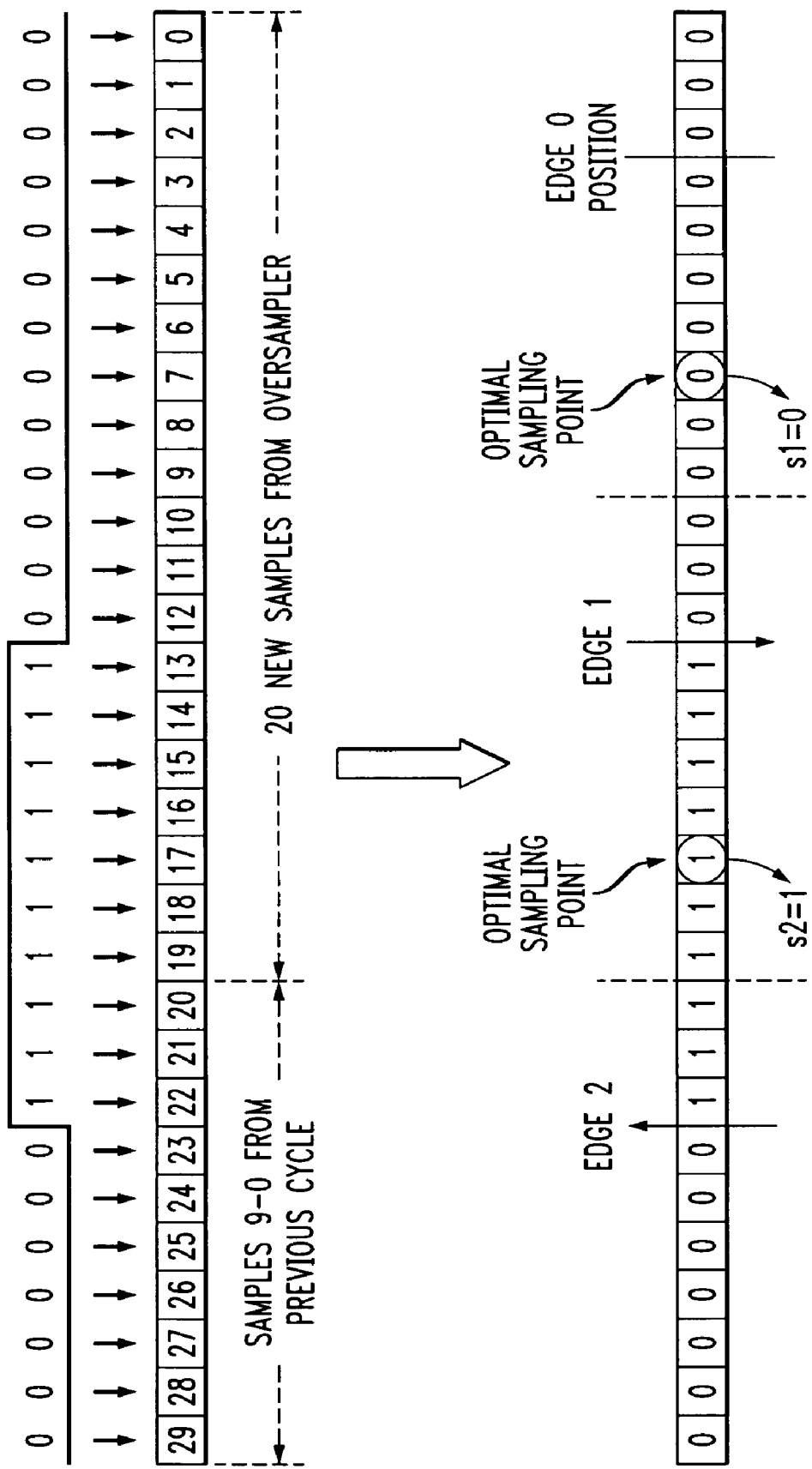
FIGS. 2, 3 and 4 are diagrams illustrating sampling operations in the data recovery module of FIG. 1.

FIG. 2 shows a typical content of the 30-bit window register 102 for the 010 bit pattern. In the example shown in the figure the two edges have been detected at bit locations 23 and 13, so the associated optimal sampling points are at bit locations 17 and 7 respectively.

If the sampling frequency were an exact integer multiple of the data transmission rate, the window would look the same for as long as the link is up. Because of the clock tolerance, the phase relationship between the two clocks changes slowly over time and the position of the edges within the window register slides. The data recovery module logic tracks the movement of the edges and updates its estimate of the optimal sampling position. However, a problem arises when the tracked edge position moves left and eventually falls out of the window register, as shown in FIG. 3, or when a previously unidentified edge enters the window register from the left, as shown in FIG. 4.

Figure 3:
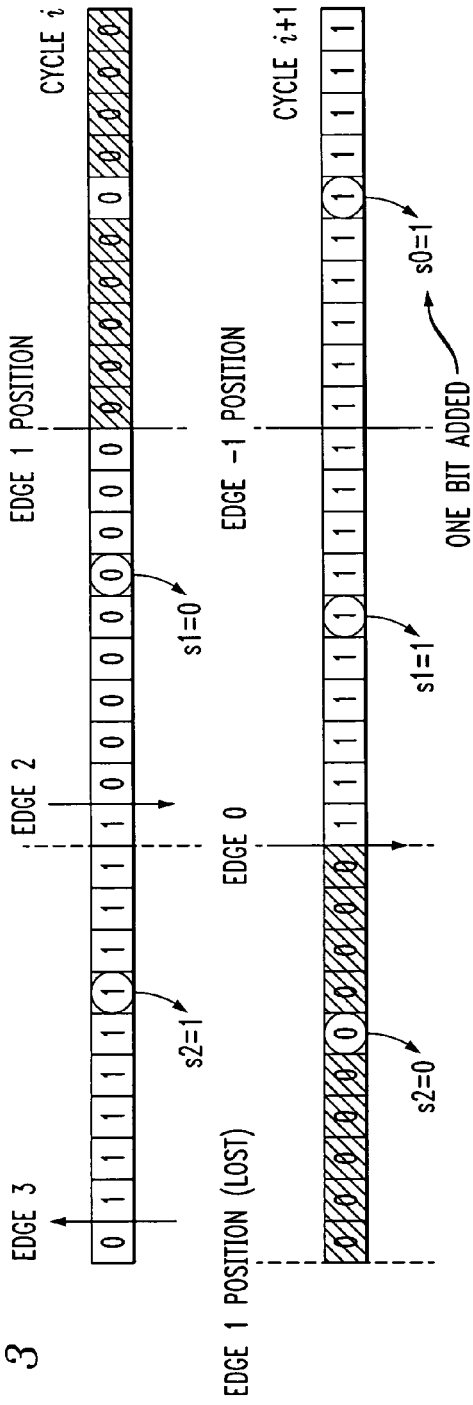
Figure 4:
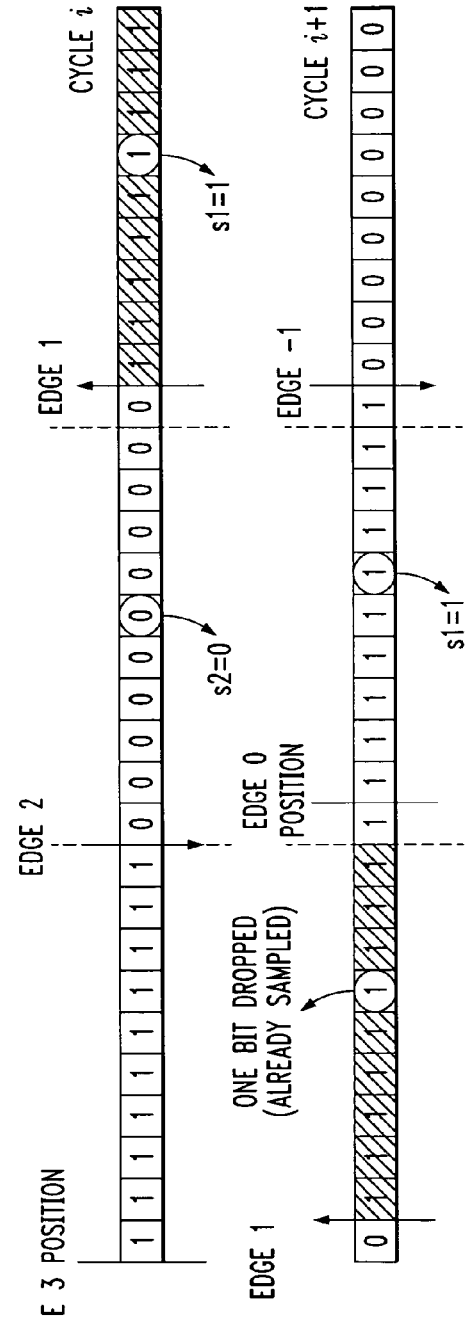

For simplicity and clarity of illustration, FIGS. 3 and 4 show the sampling points moving along with the first change of the edge position. In the illustrative embodiment, the sampling point typically changes later, after the PEC corresponding with the new edge position becomes the new winner by counting 64 edges at the new position.

Edge fallout occurs when the sampling clock runs slightly slower than its nominal rate (i.e., when $f_{sampling} < M \cdot f_{data}$). The edges inside the window move slowly to the left over time, eventually producing the case shown in FIG. 3. Observe that if the sampling point convention along with the rule for locating the two edges were strictly applied, shaded bits in the figure would be sampled neither in cycle i, nor in cycle i+1, resulting in data loss. This edge fallout situation is handled by introducing an exception cycle in which we sample three data bits instead of two. More specifically, in this exception cycle, an additional sample at bit location 24 in the 30-bit window register 120 will be taken in the same period of the receive clock in which the phase encoder 108 detects that the leftmost edge has fallen out of the window register.

When the sampling clock is slightly faster than its nominal rate (i.e., when $f_{sampling} < M \cdot f_{data}$), new edges will occasionally enter the window from the left. Strict application of the sampling point convention with the rule for locating the two edges would cause the shaded bits in FIG. 4 to be sampled twice. To handle this situation, we introduce a cycle in which only one bit is sampled. More specifically, the sampled bit at the highest bit position in the 30-bit window register will be dropped in the same period of the receive clock in which the phase encoder 108 detects that a previously unidentified edge has moved into the window register from the left hand side.

In the examples of FIGS. 3 and 4, the exception case occurs in clock cycle i+1. The phase encoder 108 stores the phase information for the previous clock cycle and uses it along with the current phase information to detect the exception condition. The recovered data bits (up to three) are stored in the data bit buffer 112 along with information about which bits are valid for a given clock cycle. Finally, the recovered data bits are clocked out of the buffer two bits at a time and passed to the next stage in the device, to be further described below in conjunction with FIG. 5.

Because all subsequent modules are designed to process exactly two recovered data bits per clock cycle, the exception cases will cause a systematic overflow or underflow of the data bit buffer 112. The logic downstream must compensate for this rate mismatch without corrupting the packet content. This is achieved by shrinking or expanding the interpacket gap (IPG) period. The Ethernet standard, as set forth in the above-cited IEEE 802.3 document, mandates a 12-byte idle period between consecutive packets, during which clock mismatch may be compensated. In general, any packet transmission system either defines the functional equivalent of the IPG or provides dedicated timeslots for transporting excess bits when needed (i.e., bit stuffing).

Figure 5:
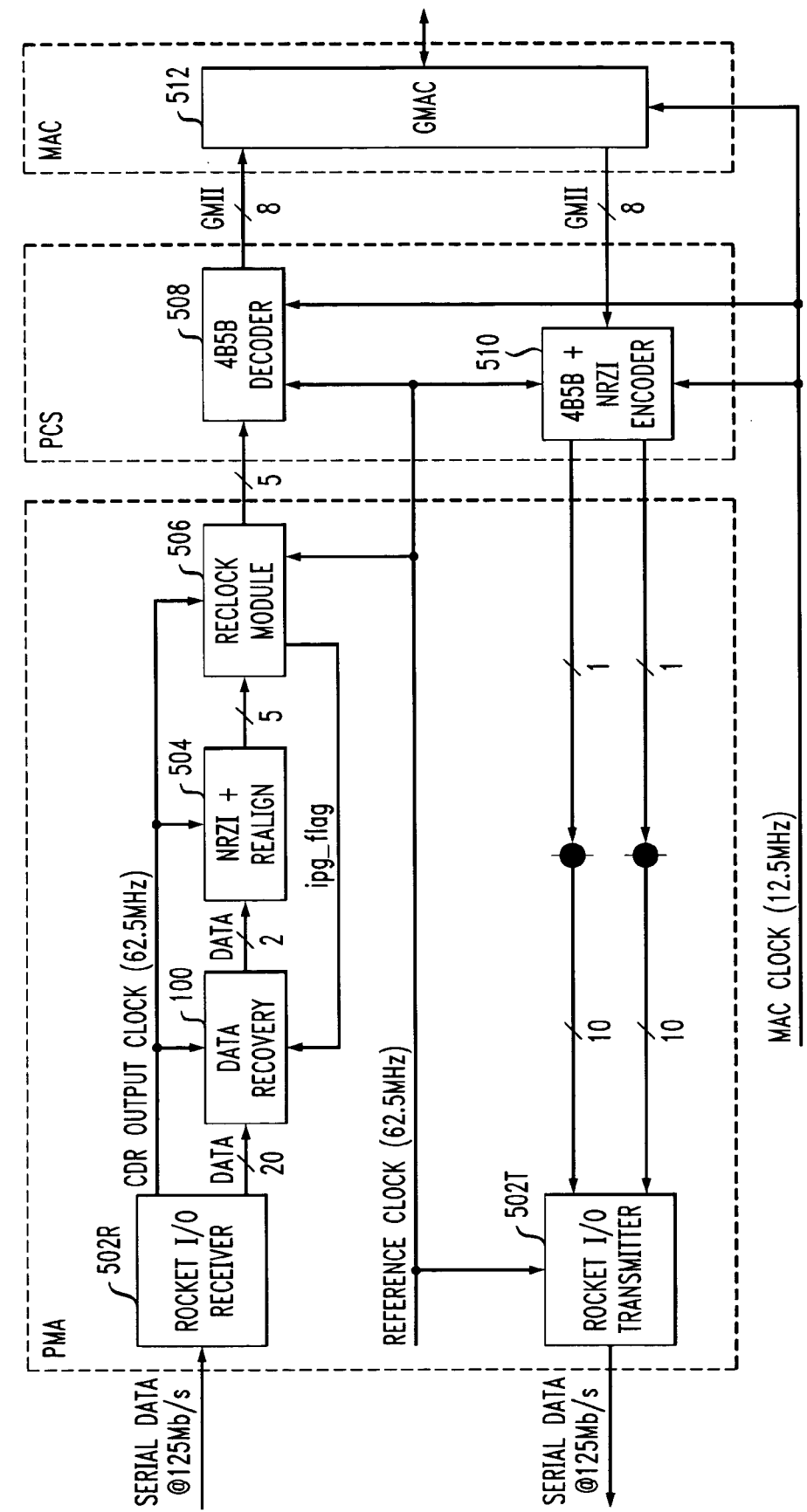
FIG. 5 is a block diagram of one possible communication device in which the data recovery module of FIG. 1 may be implemented.

Access to the data bit buffer 112 is performed in two different modes: packet mode and compensation mode. Compensation mode starts when circuitry downstream of the data recovery module 100 detects the IPG, which is signaled back to the data recovery module through an IPG flag, denoted ipg_flag, as shown in FIGS. 1 and 5. If, at that moment, the data bit buffer 112 is more than half full, the recovered bits are read and discarded until the buffer becomes half full. Note that the discarded bits belong to the IPG and do not carry information. If, on the other hand, the data bit buffer is less than half full, the data recovery module keeps writing additional bits to the buffer until it becomes half full. In either case, as soon as the buffer is half full the buffer access mode is switched back to packet mode. If the transmit clock is faster than the receive clock, a certain number of IPG bits are discarded, whereas if the transmit clock is slower, a certain number of bits are added during the IPG. Processing and detection of the IPG will be further described below in conjunction with FIG. 5.

It should be noted that the above-described rate mismatch may be compensated using alternative techniques which involve dropping one or more bits from or inserting one or more bits in a data stream of the data signal. Thus, the techniques of the invention may be adapted in a straightforward manner to provide rate mismatch compensation in communication protocols which use bit-stuffing or byte-stuffing but do not have an IPG.

In packet mode, the data recovery module writes the recovered bits to the data bit buffer. The number of bits written in each cycle is 2 in most clock cycles, but it can be 3 or 1 in occasional clock cycles. All circuits behind the buffer read and process exactly 2 recovered bits in every clock cycle. The data bit buffer must be sized so that it can never become completely full or completely empty during a packet reception. The buffer size can be calculated based on the transmitter and receiver frequency tolerances and the maximum valid packet length. In the example implementation to be described below we use a 32-bit buffer, which proved to be sufficient to support ±100 ppm clock tolerance and a packet size of up to 10 KB.

An advantage of the data recovery module in the illustrative embodiment is that the size of the circuit scales much better with the window size. More particularly, the window register size in this embodiment is fixed to 30 bits and only depends on the sampling rate. The number of PECs is also fixed and depends only on the sampling rate. To accommodate a larger window, additional bits are added to the PECs, such that the circuit scales up logarithmically with the window size. This is in contrast to the traditional sliding window approach which generally must store the entire window and have the logic for phase detection throughout the entire window. A conventional circuit of that type scales linearly with the window size and linearly with the sampling rate.

FIG. 5 shows the architecture of an Ethernet device 500 which incorporates the above-described data recovery module 100. The Ethernet device 500 in this particular implementation operates at 100 Mb/s, but can be modified in a straightforward manner to provide, for example, a dual-speed 100/1000 Mb/s Ethernet device.

The device 500 in this embodiment is implemented in an FPGA, namely, a Xilinx Virtex II Pro FPGA. The same device can also operate as a gigabit Ethernet device by loading the FPGA with a different configuration, as is done in an exemplary system implementation to be described below. As indicated previously, design of a circuit that instantiates both gigabit and 100 Mb/s specific circuitry and dynamically switches between modes is a straightforward engineering task. In the remaining description we focus on the 100 Mb/s operation.

In accordance with the IEEE 802.3 standard, the Ethernet physical layer is partitioned into three sublayers. The Physical Medium Dependent (PMD) layer comprises the optical components external to the FPGA (not shown in the figure). The Physical Medium Attachment (PMA) and Physical Coding Sublayer (PCS) layers, along with the Medium Access (MAC) layer are all integrated in the same FPGA.

The device 500 comprises a Rocket I/O transceiver, more particularly shown as receiver 502R and transmitter 502T.

The PMA layer of the transmitter comprises the Rocket I/O transmitter 502T, and the PCS layer of the transmitter comprises the 4B5B/NRZI encoder 510, which converts 4-bit data nibbles into 5-bit codewords that provide the bit transition density needed to recover the clock and data. After encoding, the transmission is done as described previously herein. Because two bits are processed at a time, for implementation convenience we interface to the MAC layer over an 8-bit GMII interface and instantiate two parallel 4B5B encoders, rather than using a 4-bit MII interface which is more common for 100 Mb/s Ethernet implementations. This allows us to use the same MAC core for both the gigabit and the 100 Mb/s mode of operation.

In the receive direction, the PMA layer comprises the Rocket I/O receiver 502R, the data recovery module 100, a realigner module 504, and a reclock module 506. Pairs of data bits are passed to the realigner module, which clocks them into a shift register (shifting out the two oldest bits) called the realignment buffer. The realignment buffer is searched for a 10-bit start-of-packet code sequence denoted as the /J/K/ sequence in the 4B5B code table. This sequence has the self-synchronization property that it cannot be constructed by concatenating any other sequence of valid 4B5B characters, even if groups of 10 bits are observed across character boundaries. Hence, it is used to establish a codeword boundary in the incoming bit stream. Once the synchronization is established, the realigner module determines the amount of shift necessary to clock out the word-aligned codewords. To facilitate the identification of the /J/K/ sequence, we also perform NRZI decoding at this stage. As discussed previously, the data recovery module may occasionally expand or shrink the IPG on bit granularity, which can result in the loss of alignment between packets. Therefore, the realigner constantly searches for the /J/K/ sequence and updates the shift amount used to perform the realignment.

The reclock module 506 comprises an elastic FIFO and a state machine that detects the start and the end of a packet. Whenever there is a packet, the aligned packet codewords are written into the FIFO, two per each clock cycle. The logic controlling the read access waits until enough data for the given packet have accumulated in the elastic FIFO, so that it can be continuously read through the end of the packet. The buffer should be sized such that it does not overflow for the maximum packet size and the worst-case positive difference between the CDR output clock and the local reference clock. Likewise, the read threshold must be chosen such that the buffer does not underflow for the maximum packet size and the worst-case negative difference between the two clocks. In the example implementation, two buffers are used in parallel, to accommodate processing of two codewords per clock cycle. Each buffer stores up to eight 4B5B codewords, with the read threshold set to half-full buffer. Since this module also has the ability to deduce where the IPG starts and ends, it is used to feed back the IPG flag to the data recovery module.

Starting from the output of the reclock module 506, all circuits run in the local clock domain. For those circuits that run in the CDR clock domain, care should be taken in setting up the timing constraints when placing and routing the design. Because the CDR clock is the output of a PLL circuit that is unsuccessfully searching for lock, the CDR clock phase may be changing (sometimes abruptly), which results in an uneven duty cycle and occasional periods that are shorter than the nominal 16 ns. Timing constraints in this clock domain must be set to withstand the worst-case shrinking of the CDR clock period. We conservatively set the minimum clock period to 7 ns, which is less than half the nominal period and far less than the expected worst case. Even with this tight constraint, the FPGA still places and routes without problems.

Finally, the data are decoded in the 4B5B decoder 508 and passed to the MAC layer over an 8-bit GMII interface. To facilitate design reuse between different port types as well as the future implementation of a dual-speed device, we use the gigabit Ethernet MAC, which functionally does not differ from any other Ethernet MAC except that it is capable of sustaining a throughput of 1 Gb/s when clocked at 125 MHz. For the 100 Mb/s interface we clock the MAC block at 12.5 MHz. To upgrade the design to a dual-speed interface, one would have to provide a mechanism for dynamically switching between the two clocks (12.5 MHz and 125 MHz) and extend the design so that the physical layer circuitry for both speeds is instantiated and dynamically selected depending on the mode the device is in. Both extensions are implementable in the FPGA device family used for this design.

In order to test the operation of the example device architecture described above, a system was implemented with eight optical interfaces, four of which were 100 Mb/s Ethernet, designed in accordance with the illustrative embodiment described herein, while the other four were gigabit Ethernet ports whose physical layer circuitry is implemented entirely in the Rocket I/O transceiver. The entire design fits into a single XC2VP40 device. The entire physical layer circuit occupies approximately 400 slices and 2 block RAMs, out of which over 200 slices comprise the data recovery module.

To validate the circuit, the system was subjected to long-term tests with minimum, maximum and random packet size distributions. The packet payload was random. Environmental stress tests that exposed the system to a full-range temperature sweep over a 24-hour period were also conducted. The transmission tests were repeated for different boards containing the FPGA device 500, different test equipment line cards, and different optical components. In other tests, optical attenuators were used on the link to set the received optical power to the minimum value specified by the optical component used. In all cases the transmission test passed and no packet losses nor bit errors were observed.

In addition, we conducted measurements inside the data recovery module targeted toward the characterization of the clock jitter and drift tolerance.

The first test demonstrates the circuit's robustness in the face of clock jitter. It was conducted by instantiating the Xilinx ChipScope debugging tool, described in S. Davis, "On Chip, Real-Time Logic Analysis with Chip-Scope ILA," XCell Journal (Xilinx), (36): 19-21, Q2 2000, on all ten PECs 104 (see FIG. 1) and recording the state of each PEC over time. The test was repeated multiple times and at the end of each counting period, the winner PEC was identified. In most cases only the winner PEC had a non-zero value, which corresponds to the case in which the sampling clock is aligned with the data signal in such a way that no ambiguity exists in terms of the edge location. In the remaining cases, at most one PEC in addition to the winner had a non-zero value. In the remainder of this discussion we will refer to this other PEC as the runner-up PEC. We observed three cases in which the runner-up PEC existed. In the first and the most frequent case, the runner-up would count to some small value and reset because the winner PEC reached the terminal value much sooner. We attribute this case to the effects of clock jitter.

Figure 6:
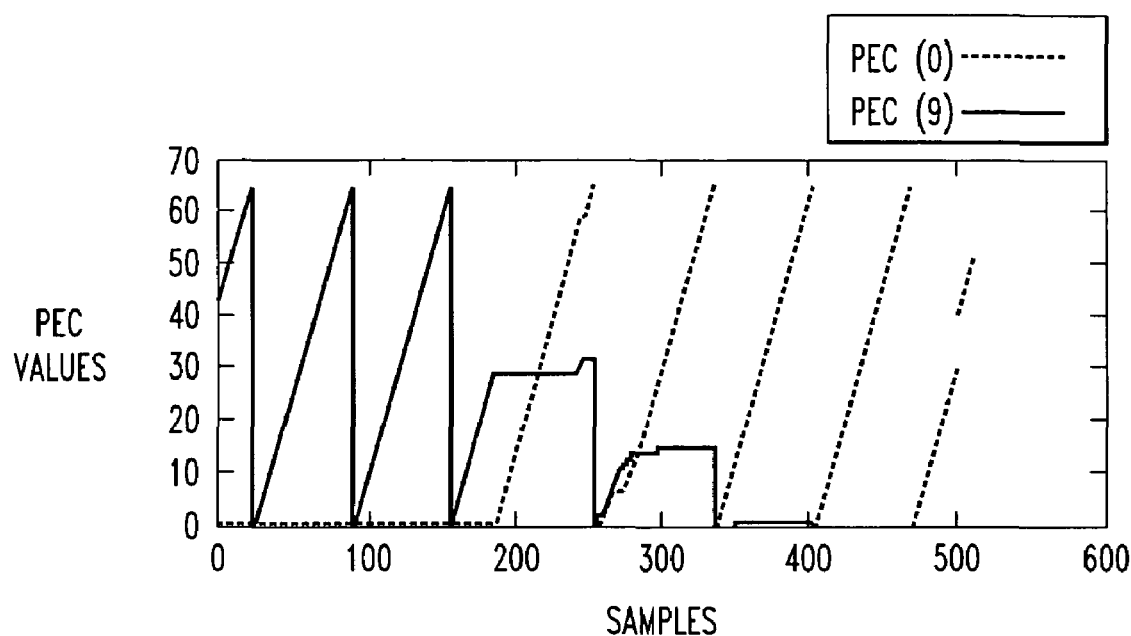
FIGS. 6 and 7 are graphs showing phase edge counts in an exemplary implementation of the data recovery module of FIG. 1 as a function of samples for respective phase handoff and phase hesitation cases.

In the second case, the runner-up would first start with some small non-zero value, which would become substantially larger in the next counting cycle and by the third or fourth counting cycle the runner-up PEC would become the winner, while the former winner would become the new runner-up. A few counting cycles later, the new runner-up would become zero and the system would continue to operate with unambiguous edge location. This case is a typical effect of systematic drift: as the phase of the sampling clock drifts away from the phase of the data clock, the handoff between the two PECs occurs. The measured values of the two PECs as a function of time are shown in FIG. 6. We captured this case by triggering ChipScope on the exception condition in the data recovery module (when it writes one or three bits into the data bit buffer instead of two). Therefore, the PECs shown with solid and dotted lines are PEC(9) and PEC(0), respectively, although a similar plot can be captured for any pair of adjacent counters. The saw-tooth shape of the graph is the result of counter reset when the winner is determined. Initially, PEC(9) is the winner and after the handoff PEC(0) becomes the winner, while PEC(9) dies out to zero.

Figure 7:
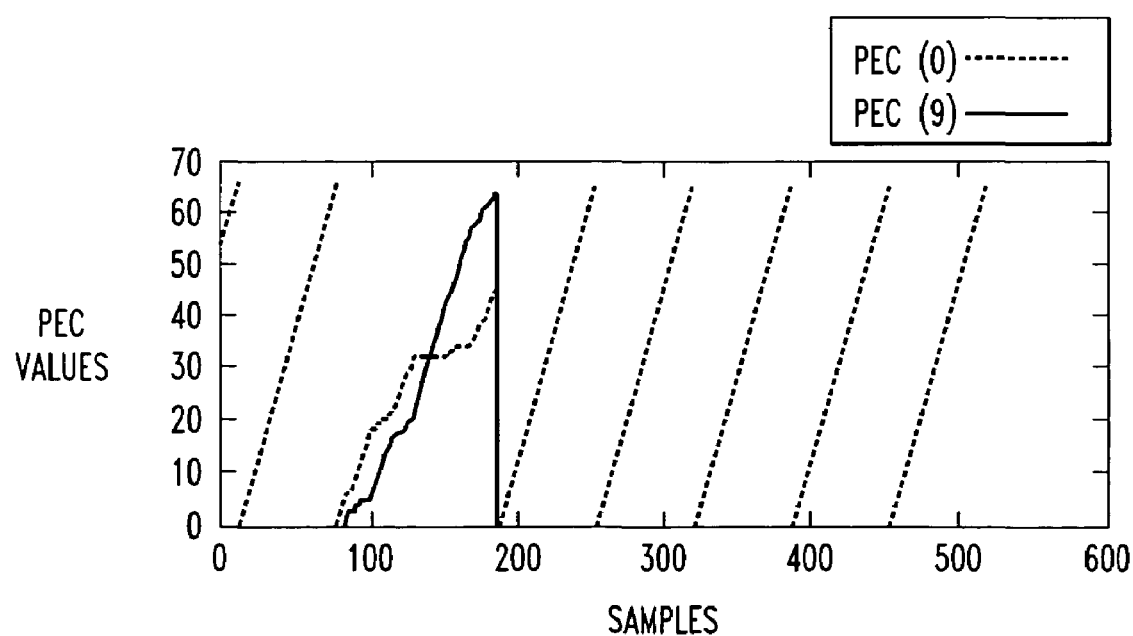

The third and the least frequent case can be observed when the winner PEC becomes the runner-up for a short time (typically a single counting cycle), but then reverts back to being the winner and remains the winner for the remaining counting cycles. This case is shown in FIG. 7. Here PEC(0) is the winner, but in the second counting cycle the sampling clock phase wanders so that PEC(9) becomes the winner for one counting period only. We attribute this "phase hesitation" to the behavior of a CDR block searching for lock, causing a non-linear drift. Unlike the jitter effects, manifested in the existence of a runner-up but an unambiguous winner, these fluctuations are on much slower scale and can result in temporary phase handoff.

During the counting periods just before and after the handoff or during the hesitation periods, the two counters are "racing" towards the final value and their progress is a stochastic process. Hence, it is possible that the winner may be determined incorrectly, resulting in a single-bit offset between the optimal and the actual sampling point. While performing measurements, we saw one case in which the value of the winner PEC was 64, whereas the runner-up value was 63. In such a case, one can have little confidence in the actual edge location. However, because the error can at most be one bit, whereas the sampling point is at least five sampling positions from the nearest edge, we postulate that the sampling rate of M=10 provides sufficiently high margin to protect from any ambiguities that can arise as a result of the misbehaving sampling clock. This claim has been confirmed by the above-noted error-free transmission tests.

Advantageously, the device 500 of FIG. 5 allows the implementation of a flexible and fully reconfigurable optical Ethernet line card that supports 100 Mb/s and 1 Gb/s rates on a common board design with a minimal set of external components. The FPGA is driving the optical components directly, allowing the features of the line card to evolve on all layers of the protocol stack, while supporting both standard transmission rates. The example device of the illustrative embodiment therefore provides an extension to the capabilities of high-speed transceivers that enhances flexibility and widens the application spectrum of FPGAs.

The technique can be modified or extended to any other packet-based transmission system. For example, certain properties that were relied on in the illustrative embodiment, such as the existence of idle time between packets (the inter-packet gap), sufficient density of bit-level transitions (edges) and sufficiently high oversampling rate (local reference frequency), are present in one form or another whenever packet transmission is involved. Similar circuits will support sub-nominal transmission rates using other protocols, as will be readily appreciated by those skilled in the art. The particular circuitry arrangements shown in FIGS. 1 and 5 can be modified accordingly, in a straightforward manner, to accommodate alternative protocols or other system requirements.

Thus, the above-described embodiments of the invention are therefore intended to be illustrative only. As indicated previously, the invention can be implemented at least in part using FPGAs or other reconfigurable hardware, as well as other arrangements of one or more integrated circuits. However, the invention is not restricted in terms of the particular configuration of the communication device in which it is implemented. Thus, a given communication device configured in accordance with the invention may include different arrangements of elements or other elements not explicitly shown or described. These and numerous other alternative embodiments within the scope of the following claims will be readily apparent to those skilled in the art.

What is claimed is:

1. A communication device comprising:
   a receiver operable with an unlocked sampling clock; and
   a data recovery module configured to detect transition edges in data signal samples generated by the receiver using the unlocked sampling clock, and to determine from the detected edges a sampling point for use in recovery of the associated data;
   wherein the data recovery module is further configured to provide adjustment in the sampling point in the presence of transition edge variations attributable to the unlocked sampling clock; and
   wherein the data recovery module further comprises:
   a window register for storing a designated number of the data signal samples;
   a plurality of phase edge counters receiving respective sets of samples from the window register, each counting edges for a designated bit position;
   control circuitry coupled to the phase edge counters and identifying from their respective counts a particular phase; and
   a data bit buffer for outputting one or more data bits responsive to the particular phase.

2. The communication device of claim 1 wherein the data recovery module further comprises:
   a phase encoder for generating an output identifying the particular phase; and
   a bit selector coupled between the window register and the data bit buffer, the bit selector receiving as a select signal the output of the phase encoder and supplying one or more of the data signal samples from the window register to the data bit buffer responsive to the select signal.

3. The communication device of claim 2 wherein the phase encoder stores phase information for a previous clock cycle and utilizes the stored phase information in conjunction with current phase information to detect an exception condition relating to the transition edge variations attributable to the unlocked sampling clock.

4. The communication device of claim 2 wherein the phase encoder is operative to detect an edge fallout condition and to cause at least one additional data signal sample to be supplied by the bit selector to the data bit buffer responsive to the detected edge fallout condition.

5. The communication device of claim 2 wherein the phase encoder is operative to detect an edge entry condition and to cause at least one less data signal sample to be supplied by the bit selector to the data bit buffer responsive to the detected edge entry condition.

6. The communication device of claim 2 wherein the data bit buffer stores one or more recovered data bits based at least in part on information about which of the bits are valid for a given clock cycle.

7. The communication device of claim 2 wherein rate mismatch causing one or more exception conditions is compensated by dropping one or more bits from or inserting one or more bits in a data stream of the data signal.

8. The communication device of claim 7 wherein the rate mismatch is compensated by shrinking or expanding an inter-packet gap period of the data signal.

9. The communication device of claim 8 wherein the data bit buffer is operable in a packet mode and a compensation mode, the compensation mode performing the rate mismatch compensation and being initiated responsive to detection of the interpacket gap period in downstream circuitry of the communication device.

10. The communication device of claim 1 wherein the communication device is implemented as at least one integrated circuit.

11. The communication device of claim 1, wherein the wherein the receiver is operable in at least first and second modes, the second mode having a data rate lower than that of the first mode, wherein the receiver in the first mode operates with a locked sampling clock, and in the second mode operates with the unlocked sampling clock.

12. The communication device of claim 11 wherein the locked sampling clock in the first mode is locked to a recovered transmit clock.

13. The communication device of claim 11 wherein the data rate of the second mode is below a lower bound of a nominal operating data rate range of the receiver.

14. The communication device of claim 11 wherein the data rate of the first mode is within a nominal operating data rate range of the receiver.

15. The communication device of claim 1 further comprising a serial transceiver, the serial transceiver comprising the receiver and a transmitter.

16. The communication device of claim 1 comprising reconfigurable hardware which implements at least a portion of the data recovery module.

17. The communication device of claim 16 wherein the reconfigurable hardware comprises at least one field programmable gate array.

18. The communication device of claim 11 wherein the first mode comprises a 100 Mb/s Ethernet mode and the second mode comprises a 1000 Mb/s Ethernet mode.

19. A method for use in a communication device comprising a receiver and a data recovery module, the method comprising the steps of:
   operating the receiver with an unlocked sampling clock; and providing data signal samples, generated using the unlocked sampling clock, from the receiver to the data recovery module;
   wherein the data recovery module is configured to detect transition edges in the data signal samples and to determine from the detected edges a sampling point for use in recovery of the associated data;

wherein the data recovery module is further configured to provide adjustment in the sampling point in the presence of transition edge variations attributable to the unlocked sampling clock; and the method further comprises the steps of:

storing a designated number of the data signal samples in a window register;

counting edges for designated bit positions in respective ones of a plurality of phase edge counters receiving respective sets of samples from the window register;

identifying a particular phase from the respective counts of the phase edge counters; and outputting one or more data bits from a data bit buffer responsive to the particular phase.

20. The method of claim 19 wherein the receiver is operable in at least first and second modes, the second mode having a data rate lower than that of the first mode, wherein the receiver in the first mode operates with a locked sampling clock, and in the second mode operates with the unlocked sampling clock.

* * * * *